(12) United States Patent
You et al.

(10) Patent No.: US 11,350,199 B2
(45) Date of Patent: May 31, 2022

(54) BUILT-IN ROTATING SHAFT TYPE SMART BLUETOOTH HEADSET CHARGING BOX

(71) Applicant: Yibai Science & Technology (Shenzhen) Co., Ltd., Shenzhen (CN)

(72) Inventors: Yunfeng You, Shenzhen (CN); Zhijian Lai, Shenzhen (CN)

(73) Assignee: YIBAI SCIENCE & TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/411,071

(22) Filed: Aug. 25, 2021

(65) Prior Publication Data
US 2021/0392426 A1 Dec. 16, 2021

Related U.S. Application Data (63) Continuation of application No. PCT/CN2021/081872, filed on Mar. 19, 2021.

(30) Foreign Application Priority Data

Apr. 24, 2020 (CN) .......................... 202020645619.9

(51) Int. Cl.
*H04R 25/00* (2006.01)
*H04R 1/10* (2006.01)
*H02J 7/00* (2006.01)

(52) U.S. Cl.
CPC .......... *H04R 1/1025* (2013.01); *H02J 7/0044* (2013.01); *H04R 2201/105* (2013.01)

(58) Field of Classification Search
CPC ....................... H04R 1/1025; H04R 2201/105; H02J 7/0044

USPC .......................................................... 381/395
See application file for complete search history.

(56) References Cited

U.S. PATENT DOCUMENTS

2021/0006889 A1* 1/2021 Geng .................... H02J 7/0045

FOREIGN PATENT DOCUMENTS

| CN | 209016764 U | 6/2019 |
| CN | 209072686 U | 7/2019 |
| CN | 209498898 U | 10/2019 |
| CN | 110913300 A | 3/2020 |
| WO | 2008153719 A2 | 12/2008 |
| WO | WO-2021081872 A1 * | 5/2021 ............... H04R 1/10 |

\* cited by examiner

*Primary Examiner* — Phylesha Dabney
(74) *Attorney, Agent, or Firm* — McClure, Qualey & Rodack, LLP (57) ABSTRACT

An earphone charging box includes a box body, a cover body, and a connecting component. The box body includes a bottom shell and a middle shell mounted in the bottom shell. The cover body is used for opening or closing the box body. The connecting component includes a connecting piece arranged on the cover body in a protruding manner and faces a surface of the middle shell, and a rotating shaft connected to the connecting piece and extends outwards. The rotating shaft is spaced from the cover body. The middle shell is provided with an accommodating space. A side surface of the accommodating space and a side wall of the bottom shell form a rotating space. The rotating shaft is rotatably accommodated in the rotating space. The cover body is rotatably connected to the box body through the rotating shaft.

9 Claims, 4 Drawing Sheets

BUILT-IN ROTATING SHAFT TYPE SMART BLUETOOTH HEADSET CHARGING BOX

CROSS REFERENCE TO THE RELATED APPLICATIONS

This application is a continuation application of International Application No. PCT/CN2021/081872, filed on Mar. 19, 2021, which is based upon and claims priority to Chinese Patent Application No. CN 202020645619.9 filed on Apr. 24, 2020, the entire contents of which are incorporated herein by reference.

TECHNICAL FIELD

The present utility model relates to the technical field of charging boxes, and in particular, to an earphone charging box with a built-in rotating shaft.

BACKGROUND

Earphone charging boxes are used for storing and charging Bluetooth earphones, and are commonly used Bluetooth earphone accessories. At present, most box type earphone charging boxes consist of bottom shells and cover bodies. Specifically, a metal rotating shaft is arranged on the edge of one of a bottom shell and a cover body, and the other of the bottom shell and the cover body is provided with a shaft sleeve. The bottom shell is rotatably connected to the cover body by means of the rotating shaft and the shaft sleeve. In this rotatable connection manner, it is difficult to make a rotating part inside the bottom shell, and can only expose a connecting part of the rotating part outside, which has a great impact on the attractiveness of the whole product. Meanwhile, rotation between the bottom shell and the cover body of the earphone charging box is realized by using the rotating shaft and the shaft sleeve, so the cost is high.

In order to hide the rotating part, the existing patent document with Application No. 201822099176.3 discloses a storage box. A first connecting part is arranged on the inner side of the bottom shell in a protruding manner, and is rotatable connected to a second connecting part arranged on a box cover, so as to prevent the connecting structure of the rotating part from exposing outside. A groove is formed in one side, far away from the ground and the center, of the first connecting part, so a bottom end, close to the side wall of the first connecting part, of the box cover is accommodated or partially accommodated in the groove when the storage box is in an open state. However, the first connecting part of this structure is still exposed inside the bottom shell, which not only occupies the space of the bottom shell, but also affects the attractiveness of the interior of the bottom shell. Meanwhile, the thickness of the first connecting part is very thin due to the formation of the groove, so the box cover is easily broken off when being dragged or pressed by an external force. In addition, during opening the storage box, an upward groove wall of the groove will be partially exposed to the outer side of the box cover. Dust or impurities fall on the groove wall easily, which causes rotating lagging of the box cover. However, in order to solve this problem, if the box cover is accommodated in the edge of the groove and presses against the groove wall of the groove, then the box cover will be worn, which forms service traces easily, and causes the aging of the earphone box.

SUMMARY

A main objective of the present utility model is to provide an earphone charging box, which aims to solve the problems that a connecting structure of a rotating part of a conventional earphone charging box affects the attractiveness of a bottom shell, and is easy to break off and accumulate dust.

To achieve previously described objective, the present utility model provides an earphone charging box. A connecting component is built in one side, facing a box body, of a cover body, and a rotating shaft of the connecting component is built in a rotating space formed by a middle shell and the bottom shell, so that the connecting component is not exposed outside when the cover body of the earphone charging box is opened and closed. In addition, the connecting component is not easy to accumulate dust and wear, and the cover body is not easy to age.

The earphone charging box include:

a box body, the box body including a bottom shell and a middle shell, and the middle shell being mounted on the bottom shell; and a cover body, rotatably mounted on the box body, and used for opening or closing the box body.

The middle shell is provided with an upper surface facing the cover body and a side surface adjacent to the upper surface, and the upper surface is sunken to form a notch groove for communicating with the side surface of the middle shell.

The side surface is sunken to form a first groove located in one side of the notch groove, or the side surface is sunken to form first grooves located on two sides of the notch groove. The notch groove and the side wall of the bottom shell enclose to form an accommodating space. The first groove and the side wall of the bottom shell enclose to form a rotating space.

The cover body is provided with a rotating edge and a covering edge. A connecting component is arranged on the surface, facing the middle shell, of the cover body in a protruding manner. The connecting component is arranged close to the rotating edge. A rotating shaft is arranged on one side, back to the covering edge, of the connecting component. The rotating shaft is rotatably mounted in the rotating space. The connecting component has a closed state of being placed in the accommodating space, and an open state of being far away from the accommodating space.

Further, the connecting component includes a connecting table, a connecting piece, a locking piece, and the rotating shaft.

The connecting table is arranged on the cover body.

The connecting piece is connected to the connecting table through the locking piece. When the connecting component is in the closed state, the connecting piece is placed in the accommodating space.

The rotating shaft is connected to one side, back to the covering edge, of the connecting piece. One end of the rotating shaft is protruded from the connecting piece, or two ends of the rotating shaft are protruded from the connecting pieces, so that the two ends of the rotating shaft are placed in the rotating space.

Further, a fixing hole is formed in the connecting table. Internal screw threads are formed in the inner wall of the fixing hole. A through hole is formed in the connecting piece. External screw threads are formed in the locking piece. The locking piece penetrates through the through hole to be in threaded connection with the fixing hole.

Further, the connecting piece includes a fixed section and a connecting section connected to the fixed section.

The fixed section is provided with a fitting surface and an exposed surface arranged opposite to the fitting surface. The fitting surface is connected to the connecting table. The exposed surface presses against the bottom of the notch groove when the connecting component is in the closed state.

One end of the connecting section is connected to the fixed section, and the other end of the connecting section is connected to the rotating shaft.

The exposed surface of the fixed section is flush with one side of the connecting section. The fitting surface of the fixed section is arranged in a manner of protruding from the other side of the connecting section. The rotating shaft is arranged in a manner of protruding from the connecting section in a direction from the fitting surface to the exposed surface, so as to form a second groove with the fixed section by taking the connecting section as a bottom.

Further, the connecting table is provided with a positioning groove. The connecting piece further includes a positioning piece. The positioning piece is arranged on the fitting surface of the fixed section.

Further, both the connecting piece and the rotating shaft are made of a metal material, or a plastic material.

Further, the connecting component and the cover body are integrally formed.

Further, the bottom shell is clamped with the middle shell.

Further, a third groove is formed in a peripheral side of the bottom shell. A boss is formed in the peripheral side of the middle shell. The bottom shell is clamped with the middle shell through the fit of the boss and the groove.

Further, a buckling groove is formed in the middle shell. Further, a buckling groove is formed in the middle shell, and the buckling groove is positioned on the opposite side of the notch groove, and the cover body further includes a buckling piece arranged corresponding to the buckling groove.

Compared with the prior art, the present utility model achieves the following beneficial effects.

In the technical solution of the present utility model, the cover body is mounted on the box body through the connecting component. In addition, the connecting component is not exposed from the box body and the cover body. Specifically, the connecting component is arranged on the inner side of the cover body in a protruding manner, and the rotating shaft which is spaced from the cover body is arranged on the connecting piece of the connecting component. The rotating shaft is accommodated and limited through the rotating space enclosed by the middle shell and the bottom shell. The rotating shaft can rotate relative to the box body, so as to realize rotatable connection between the cover body and the box body. At this time, the rotating shaft can be hidden in the rotating space. The connecting piece is hidden in the accommodating space when the cover body is closed, and is located inside the cover body when the cover body is open, which prevents the connecting component from exposing outside. In this way, the connecting component is arranged at the cover body, which not only prevents from occupying the space inside the bottom shell, but also greatly improves the attractiveness of the overall earphone charging box and the bottom shell thereof. Meanwhile, the rotating space is limited and formed by the middle shell and the bottom shell together, so the rotating shaft is protected and limited by the bottom shell and the middle shell simultaneously, which not only prevents the rotating part for realizing the rotatable connection between the cover body and the box body from arranging a shaft sleeve and a first connecting part arranged on the bottom shell in the existing patent document. Moreover, the situation that the rotating part which is rotatably connected to the rotating shaft is thin and is prone to breaking is avoided due to a stable structure between the middle shell and the bottom shell. In addition, the connecting component is arranged on the cover body, the rotating shaft is accommodated in the rotating space, and the rotating space is located inside the box body without exposing, so that the situation of affecting the rotation of the cover body due to dust or impurities will be avoided. It is not necessary to arrange the cover body to press against the box body, which prevents the cover body from wearing during rotating, and prevents service traces from forming to cause the aging of the earphone box.

BRIEF DESCRIPTION OF THE DRAWINGS

To describe the technical solutions in the embodiments of the present utility model or in the prior art more clearly, the following briefly describes the accompanying drawings required for describing the embodiments or the prior art. Apparently, the accompanying drawings in the following description show merely some embodiments of the present utility model, and those of ordinary skill in the art may still derive other accompanying drawings according to the structures shown in these accompanying drawings without creative efforts.

| Reference signs in drawings: | | | |
|---|---|---|---|
| Reference sign | Name | Reference sign | Name |
| 100 | Bottom shell | 240 | Buckling groove |
| 200 | Middle shell | 250 | Bluetooth earphone charging position |
| 300 | Cover body | | |
| 400 | Control mainboard | 310 | Connecting component |
| 500 | Battery | 311 | Connecting table |
| 110 | Third groove | 312 | Connecting piece |
| 210 | Notch groove | 313 | Rotating shaft |
| 220 | First groove | 314 | Second groove |
| 230 | Boss | 320 | Buckling piece |

The achievement of the objective, functional features, and advantages of the present utility model will further be described in combination with the embodiments and with reference to the accompanying drawings.

DETAILED DESCRIPTION OF THE EMBODIMENTS

The technical solutions in the embodiments of the present utility model will be clearly and completely described below with reference to the accompanying drawings in the embodiments of the present utility model. It is apparent that the described embodiments are merely part rather than all embodiments of the present utility model. Based on the embodiments of the present utility model, all other embodiments obtained by those of ordinary skill in the art without creative work fall within the scope of protection of the present utility model.

It is noted that if the embodiments of the present utility model involve directional indication (such as upper, lower, left, right, front, rear . . . ), then the directional indication is only used to explain the relative position relationship, movement situations, etc. among various components under a specific attitude (as shown in the accompanying drawings). If the specific attitude changes, then the directional indication will change accordingly.

In addition, if the embodiments of the present utility model involve the description of "first", "second", etc., then the description of the "first", "second", etc. is only for descriptive purpose, and shall not be understood as indicating or implicating its relative importance or implicitly indicating the number of indicated technical features. Therefore, a feature defined by "first" and "second" may explicitly or implicitly indicate inclusion of at least one such feature. In addition, the technical solutions among various embodiments can be combined with one another, but it must be based on the realization of those of ordinary in the art. When the combination of the technical solutions is contradictory or impossible, it shall be considered that the combination of the technical solutions does not exist and is not within the scope of protection required by the present utility model.

Figure 1:
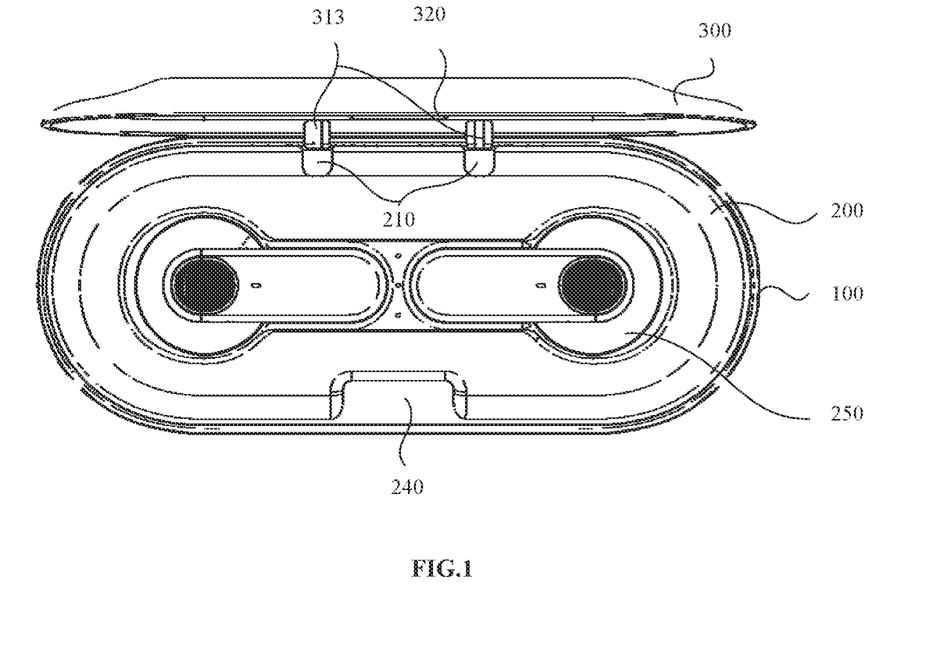
FIG. 1 is a vertical view of one embodiment of an earphone charging box of the present utility model.
Figure 2:
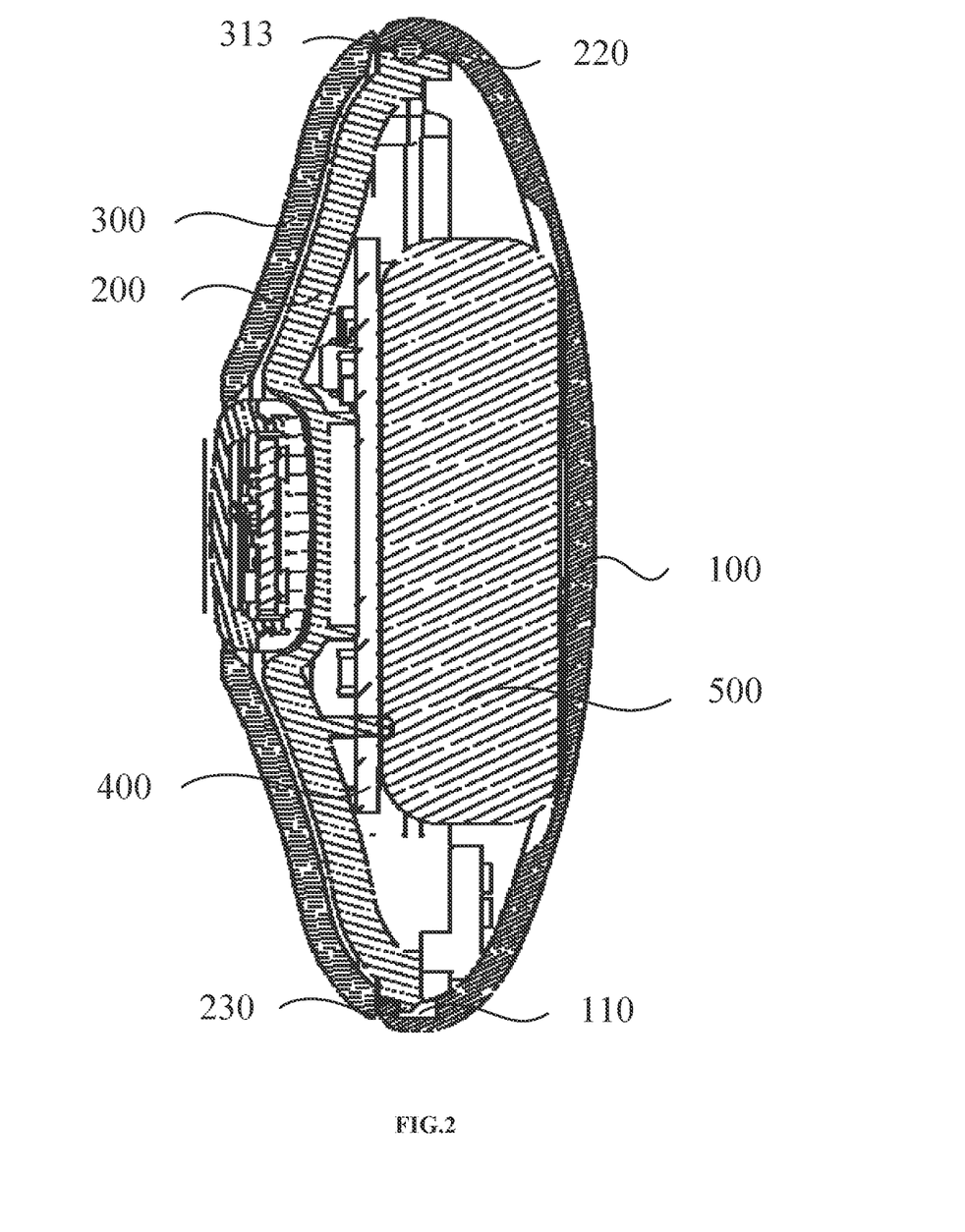
FIG. 2 is a side view of one embodiment of an earphone charging box of the present utility model.
Figure 3:
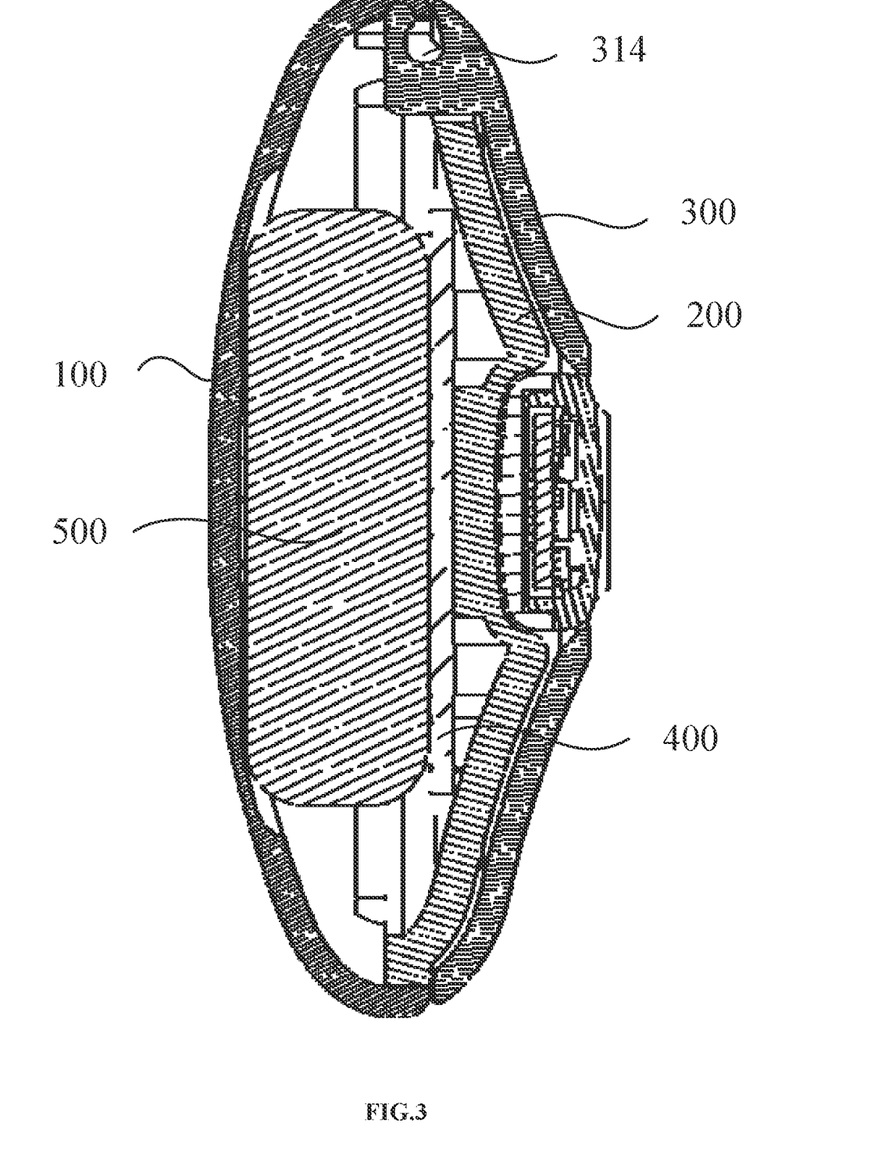
FIG. 3 is a diagram of FIG. 2 in another view.

Referring to FIG. 1, FIG. 2, and FIG. 3, the present utility model provides an intelligent Bluetooth earphone charging box with a built-in rotating shaft. The intelligent Bluetooth earphone charging box with a built-in rotating shaft includes:

box body, the box body including a bottom shell 100 and a middle shell 200, and the middle shell 200 being mounted on the bottom shell 100 and a cover body 300, rotatably mounted on the box body, and used for opening or closing the box body.

The middle shell 200 is provided with an upper surface facing the cover body 300 and a side surface adjacent to the upper surface, and the upper surface is sunken to form a notch groove 210 for communicating with the side surface of the middle shell 200.

The side surface is sunken to form a first groove 220 located in one side of the notch groove 210, or the side surface is sunken to form first grooves 220 located on two sides of the notch groove 210. The notch groove 210 and the side wall of the bottom shell 100 enclose to form an accommodating space. The first groove 220 and the side wall of the bottom shell 100 enclose to form a rotating space.

The cover body 300 is provided with a rotating edge and a covering edge. A connecting component 310 is arranged on the surface, facing the middle shell 200, of the cover body 300 in a protruding manner. The connecting component 310 is arranged close to the rotating edge. A rotating shaft 313 is arranged on one side, back to the covering edge, of the connecting component 310. The rotating shaft 313 is rotatably mounted in the rotating space. The connecting component 310 has a closed state of being placed in the accommodating space, and an open state of being far away from the accommodating space.

In the present embodiment, in order to reduce relative movement between the bottom shell 100 and the middle shell 200 to bring the influence of charging instability, to the intelligent earphone charging box with a built-in rotating shaft, the middle shell 200 is mounted on the bottom shell 100 in a nesting manner, so that the periphery of the middle shell 200 is buckled by the bottom shell 100 and a box body of the intelligent earphone charging box with a built-in rotating shaft is formed. Because the box body of the intelligent Bluetooth earphone charging box with a built-in rotating shaft is in direct contact with a Bluetooth earphone to be charged, a cover body 300 is arranged in order to reduce the influence caused by external dust. The cover body 300 is connected to the box body of the intelligent Bluetooth earphone charging box with a built-in rotating shaft through the connecting component 310. Specifically, in order to completely place the connecting component 310 in the space limited by the box body and the cover body 300 together without exposing the box body, the first groove 220 is formed in the middle shell 200. The first groove 220 is formed in the side surface of the middle shell 200. In this way, the first groove 220 and the side wall of the bottom shell 100 limit a rotating space for accommodating the rotating shaft 313 together. The cover body 300 is rotatably connected to the box body through the rotating shaft 313. In the present embodiment, the rotating space is formed inside the box body, and the rotating shaft 313 is placed inside the rotating space for rotating, so that the overall connecting component 310 is placed inside the box body. Therefore, the connecting component 310 cannot be exposed even in a process of opening or closing the cover body 300, so that the attractiveness of the intelligent Bluetooth earphone charging box with a built-in rotating shaft is greatly improved. Meanwhile, in order to make the cover body 300 and the box body close more tightly when the connecting component 310 is in a closed state, a space, i.e., a notch groove 210, for accommodating the connecting component 310 is formed in the middle shell 200. The previously described "expose" refers to that the connecting component 310 is exposed outside one side, back to the middle shell 200, of the cover body 300. "The connecting component 310 cannot be exposed" refer to that a user cannot see the connecting component 310 in any direction when the cover body 300 is closed at the box body, i.e., the connecting component 310 cannot be exposed to view. When the cover body 300 is opened, the user cannot be back to the connecting component 310 on one side of the box body from the cover body 300.

It should be understood that the first groove 220 may be formed in one side of the notch groove 210. At this time, the rotating shaft 313 with a corresponding end arranged in a protruding manner is arranged on a corresponding connecting component 310. The rotating shaft 313 may rotate in the rotating space enclosed by the first groove 220, the bottom shell 100, and the middle shell 200, and can realize rotatable connection between the cover body 300 and the box body.

The first grooves 220 may also be formed in two sides of the notch groove 210. At this time, the rotating shaft 313 with corresponding two ends arranged in a protruding manner is arranged on a corresponding connecting component 310. The rotating shaft 313 may rotate in the rotating space enclosed by the first groove 220, the bottom shell 100, and the middle shell 200, and can realize rotatable connection between the cover body 300 and the box body.

It is to be explained that the closed state of the connection component 310 refers to that the cover body 300 and the box body of the intelligent Bluetooth earphone charging box with a built-in rotating shaft are in a closed state. At this time, the space limited by the box body and the cover body 300 together is isolated from the outside world. The open state of the connecting component 310 refers to that the cover body 300 and the box body of the intelligent Bluetooth earphone charging box with a built-in rotating shaft are in an open state. At this time, the space limited by the box body and the cover body 300 together is communicated with the outside world. The user may place a Bluetooth earphone to be charged into the intelligent Bluetooth earphone charging box with a built-in rotating shaft for charging the Bluetooth earphone.

Figure 4:
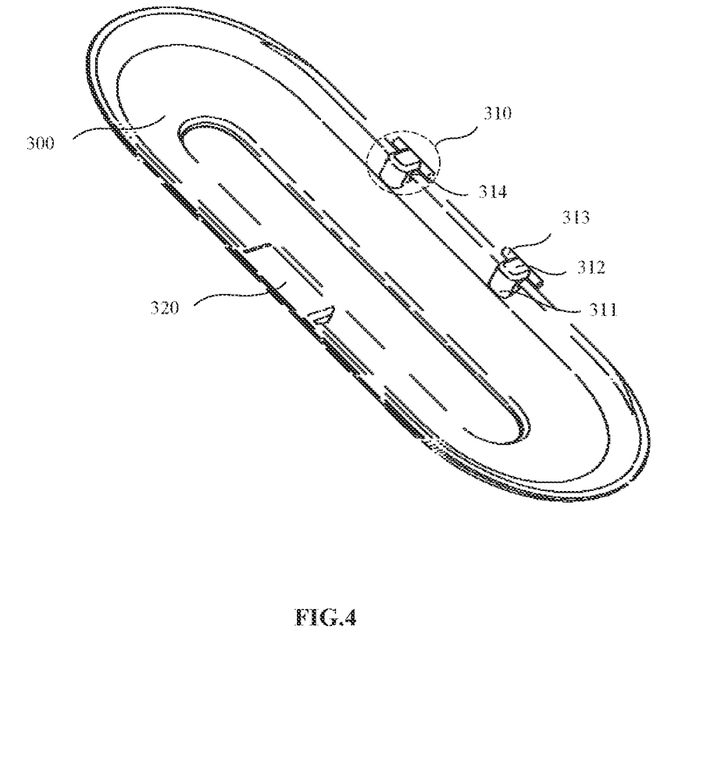
FIG. 4 is a schematic structural diagram of an embodiment of a cover body of the present utility model.

Referring to FIG. 3 and FIG. 4, further, the connecting component 310 includes a connecting table 311, a connecting piece 312, a locking piece, and a rotating shaft 313.

The connecting table 311 is connected to the cover body 300.

The connecting piece 312 is connected to the connecting table 311 through the locking piece. When the connecting component 310 is in the closed state, the connecting piece 312 is placed in an accommodating space.

The rotating shaft 313 is connected to the connecting piece 312. One end of the rotating shaft 313 is protruded from the connecting piece 312, or two ends of the rotating shaft 313 are protruded from the connecting pieces 312, so that the two ends of the rotating shaft 313 are placed in the rotating space.

In the present embodiment, in order to enhance the connection between the cover body 300 and the connecting component 310, the connecting table 311 is fixedly arranged on the inner wall of the cover body 300, and the connecting table 311 is arranged corresponding to the notch groove 210. Meanwhile, in order to enhance the connection between the connecting piece 312 and the connecting table 311, the locking piece is arranged. The connecting piece 312 is fixedly connected to the connecting table 311 by the locking piece, so as to prevent the connecting piece 312 and the connecting table 311 from dislocating or sliding to make the cover body 300 and the box body close untightly and reduce the user experience of a user. Moreover, in order to realize rotatable connection between the cover body 300 and the box body, the rotating shaft 313 is arranged. The rotating shaft 313 is connected to the connecting piece 312. Optionally, the rotating shaft 313 is a rotating shaft. Specifically, the axial direction of the rotating shaft is parallel to the peripheral side of the cover body 300, and the rotating shaft is arranged close to the peripheral side of the cover body 300. That is to say, in the direction perpendicular to the connection of the rotating shaft and the connecting piece 312, the rotating shaft 313 and the connecting piece 312 are arranged towards the other side of the cover body 300 in sequence. A shaft of the rotating shaft 313 is protruded from one end of the connecting piece 312, so that one side of the connecting component 310 is provided with the rotating shaft 313 that may be accommodated in the rotating space. Or, the axial two ends of the rotating shaft 313 are protruded from two ends of the connecting piece 312, so that the two sides of the connecting component 310 have rotating shafts 313 that may be accommodated in the rotating space. When the user rotates the cover body 300, the two ends of the rotating shaft rotate in the rotating space and drive the connecting component 310 to move to the direction far away from the middle shell 200, so as to open the intelligent Bluetooth earphone charging box with a built-in rotating shaft. In this way, the rotating space is formed by matching the groove first groove 220 of the middle shell 200 and the bottom shell 100, so that the overall connecting component 310 is accommodated in the space limited by the bottom shell 100 and the cover body 300 together. Therefore, the connecting structure connected to the intelligent Bluetooth earphone charging box with a built-in rotating shaft is not exposed outside, and the attractiveness of the intelligent Bluetooth earphone charging box with a built-in rotating shaft is greatly improved.

The cover body 300 is mounted on the box body through the connecting component 310. In addition, the connecting component 310 is not exposed from the box body and the cover body 300. Specifically, the connecting component 310 is arranged on the inner side of the cover body 300 in a protruding manner, and the rotating shaft 313 which is spaced from the cover body 300 is arranged on the connecting piece 312 of the connecting component 310. The rotating shaft 313 is accommodated and limited through the rotating space enclosed by the middle shell 200 and the bottom shell 100. The rotating shaft 313 can rotate relative to the box body, so as to realize rotatable connection between the cover body 300 and the box body. At this time, the rotating shaft 313 can be hidden in the rotating space. The connecting piece 312 is hidden in the accommodating space when the cover body 300 is closed, and is located inside the cover body 300 when the cover body 300 is open, which prevents the connecting component 310 from exposing outside. In this way, the connecting component 310 is arranged on the cover body 300, which not only prevents from occupying the space inside the bottom shell 100, but also greatly improves the attractiveness of the overall earphone charging box and the bottom shell 100 thereof. Meanwhile, the rotating space is limited and formed by the middle shell 200 and the bottom shell 100 together, so the rotating shaft 313 is protected and limited by the bottom shell 100 and the middle shell 200 simultaneously, which not only prevents the rotating part for realizing the rotatable connection between the cover body 300 and the box body from arranging a shaft sleeve and a first connecting part arranged on the bottom shell 100 in the existing patent document. Moreover, the situation that the rotating part which is rotatably connected to the rotating shaft 313 is thin and is prone to breaking is avoided due to a stable structure between the middle shell 200 and the bottom shell 100. In addition, the connecting component 310 is arranged on the cover body 300, the rotating shaft 313 is accommodated in the rotating space, and the rotating space is located inside the box body without exposing, so that the situation of affecting the rotation of the cover body 300 due to dust or impurities will be avoided. It is not necessary to arrange the cover body 300 to press against the box body, which prevents the cover body 300 from wearing during rotating.

In one embodiment, in order to enhance the connection tightness between the cover body 300 and the box body and enhance the service life of the connecting component 310, two notch grooves 210 are formed in the middle shell 200. Correspondingly, two groups of connecting components 310 are arranged, and the connecting components 310 are in one-to-one correspondence with the notch grooves 210.

In another embodiment, in order to reduce the assembly cost, the connecting table 311 and the cover body 300 are formed integrally.

Specifically, a fixing hole is formed in the connecting table 311. Internal screw threads are formed in the inner wall of the fixing hole. A through hole is formed in the connecting piece 312. External screw threads are formed in the locking piece. The locking piece penetrates through the through hole to be in threaded connection with the fixing hole.

In the present embodiment, in order to make the connection between the connecting table 311 and the connecting piece 312 firmer, the connecting table 311 is in threaded connection with the connecting piece 312. Specifically, internal screw threads are formed in the inner wall of the fixing hole in the connecting table 311, and matched external screw threads are formed in the outer wall of the locking piece. Meanwhile, a through hole for the locking piece to penetrate through is formed in the connecting piece 312. In this way, the locking piece penetrates through the through hole, and is further in threaded connection with the internal screw threads of the fixing hole, so as to realize the connection between the connecting table 311 and the connecting piece 312. Optionally, the locking piece is a bolt. Optionally, a fixed ring matched with the minimum diameter of an external screw thread section arranged on the locking piece is arranged on the inner wall of the through hole. It should be noted that the external screw thread section of the locking piece may pass through the fixed ring by rotating. Under the action of the fixed ring, the fixation between the connecting piece 312 and the locking piece is firmer, and does not loosen and displace easily to dislocate.

Specifically, the connecting piece 312 includes a fixed section and a connecting piece connected to the fixed section.

The fixed section is provided with a fitting surface and an exposed surface arranged opposite to the fitting surface. The fitting surface is connected to the connecting table 311. The exposed surface presses against the bottom of the notch groove 210 when the connecting component 310 is in the closed state.

One end of the connecting section is connected to the fixed section, and the other end of the connecting section is connected to the rotating shaft 313.

The exposed surface of the fixed section is flush with one side of the connecting section. The fitting surface of the fixed section is arranged in a manner of protruding from the other side of the connecting section. The rotating shaft 313 is arranged in a manner of protruding from the connecting section in a direction from the fitting surface to the exposed surface, so as to form a second groove 314 with the fixed section by taking the connecting section as a bottom. The "exposed surface" refers to that the exposed surface may be exposed in view on the side, facing the middle shell 200, of the cover body 300 when the cover body 300 is open.

In the present embodiment, in order to realize the cooperative use of the connecting component 310 and the rotating space, the connecting piece 312 is arranged as a fixed section and a connecting section on the basis of the specificity of the formation of the rotating space. Meanwhile, in order to realize dual-axis rotating, the second groove 314 which takes the connecting section as a bottom is formed through the arrangement position relationship among the rotating shaft 313, the fixed section, and the connecting section. The second groove 314 is used for accommodating the edge of the bottom shell 100. In addition, the second groove 314 can rotate along the edge of the bottom shell 100 when the cover body 300 is away from the box body. In this way, at the position where the connecting component 310 is arranged, a first rotating structure in rotating fit with a first rotating space that is limited by the rotating shaft 313, the first groove 220 and the bottom shell 100, and a second rotating structure in rotating fit with the edge of the bottom shell 100 and the second groove 314 are formed. The cover body 300 is rotatably connected to the box body through the first rotating structure and the second rotating structure. It should be understood that the rotation is realized in the first rotating structure by rotating the rotating shaft 313, and the rotation is realized in the second rotating structure by rotating the second groove 314. It can be seen that the second groove 314 is always under the cover of the cover body 300. When the cover body 300 is closed on the box body, the connecting component 310 is located in a cavity formed by the cover body 300 and the box body, so that external dust or impurities cannot fall in. When the cover body 300 is open, the first groove is overturned. At this time, the first groove does not have a groove wall with surface upward, so the dust or impurities cannot fall onto the groove wall. The edge of the bottom shell 100 does not need to press against the cover body 300, which can not only ensure that the cover body 300 is opened smoothly, but also ensure that both the bottom shell 100 and the cover body 300 cannot be worn. When the cover body 300 is opened, the edge of the bottom shell 100 slides into the second groove 314. The cover body 300 covers the edge of the bottom shell 100. In this way, the edge of the bottom shell 100 cannot be exposed outside. A folding angle or a groove cannot be exposed in the appearance when the cover body 300 is opened like the storage box disclosed by the patent document with the Application No. 201822099176.3, which further improves the attractiveness when the cover body 300 is open.

Further, the connecting table 311 is provided with a positioning groove. The connecting piece 312 further includes a positioning piece. The positioning piece is arranged on the fitting surface of the fixed section.

In the present embodiment, in order to reduce the workload caused by inaccurate alignment of the connecting table 311 and the connecting piece 312 during assembling, positioning pieces are arranged on the connecting piece 312. Optionally, two positioning pieces are arranged. The two positioning pieces are arranged close to the through hole in the connecting piece 312, and are arranged on the two opposite sides of the through hole. It should be understood that positioning grooves are formed in the connecting table 311 to match the positioning pieces. The positioning grooves are in one-to-one correspondence with the positioning pieces.

In one embodiment, the positioning pieces are positioning bosses.

Specifically, in order to reduce the assembly cost, the connecting piece 312 and the rotating shaft 313 are formed integrally.

Specifically, both the connecting piece 312 and the rotating shaft 313 are made of a metal material, or a plastic material.

Optionally, in order to reduce assembly cost and the assembly time, the connecting component 310 and the cover body 300 are arranged integrally.

Referring to FIG. 2, further, in order to facilitate the disassembling and the assembling between the bottom shell 100 and the middle shell 200 and facilitate subsequent maintenance, the bottom shell 100 is clamped with the middle shell 200.

Specifically, a third groove 110 is formed in the peripheral side of the bottom shell 100. A boss 230 is formed on the peripheral side of the middle shell 200. The bottom shell 100 is clamped with the middle shell 200 through the matching between the boss 230 and the third groove 110.

In the present embodiment, in order to completely accommodate the middle shell 200 in the bottom shell 100, the boss 230 is formed on the peripheral side of the middle shell 200, and the third groove 110 is formed at the position, corresponding to the boss 230, of the bottom shell 100. The third groove 110 is used for clamping the boss 230, and the middle shell 200 is completely limited in the bottom shell 100.

In the embodiment, in order to prevent the dislocating and sliding between the boss 230 and the third groove 110, a limiting ring is arranged on the peripheral side of the bottom shell 100. The limiting ring is used for limiting the boss 230 from sliding out from the third groove 110, so that the fit between the bottom shell 100 and the middle shell 200 is more tight. At this time, part of the limiting ring is accommodated in the second groove 314 so as to match with the second groove 314 to form the second rotating structure. It should be understood that the limiting ring is adapted to the second groove 314, and the second groove 314 can rotate along the limiting ring, so as to realize the opening or closing of the cover body 300 and the box body.

In another embodiment, in order to fasten the connection between the bottom shell 100 and the middle shell 200, a plurality of bosses 230 are arranged. At this time, the third grooves 110 are in one-to-one correspondence with the bosses 230, and the third grooves 110 are adapted to the bosses 230.

Referring to FIG. 2 and FIG. 3, further, the bottom shell 100 and the middle shell 200 limit a mounting space together. The intelligent Bluetooth earphone charging box with a built-in rotating shaft further includes a control mainboard 400 and a battery 500. Both the control mainboard 400 and the battery 500 are arranged in the mounting space, and the control mainboard 400 is located between the middle shell 200 and the battery 500. The battery 500 is located between the control mainboard 400 and the bottom shell 100. The middle shell 200 is provided with a Bluetooth earphone charging position 250. The Bluetooth earphone charging position 250 is connected with the control mainboard 400 through signals. The Bluetooth earphone charging position 250 is electrically connected to the battery 500.

In the present embodiment, in order to realize the convenience of the intelligent Bluetooth earphone charging box with a built-in rotating shaft, the control mainboard 400 and the battery 500 are arranged. The battery 500 used for charging is directly arranged on the intelligent Bluetooth earphone charging box with a built-in rotating shaft. In order to reduce the influence of dust, external environment, human factors, etc. on the intelligent Bluetooth earphone charging box with a built-in rotating shaft, the control mainboard 400 used for controlling a charging circuit and the battery 500 used for providing a power supply are arranged in the mounting space formed by the bottom shell 100 and the middle shell 200. The mounting space is sealed relatively. In order to realize the support of a Bluetooth earphone during charging, the Bluetooth earphone charging position 250 is arranged on the middle shell 200, and the Bluetooth earphone charging position 250 is electrically connected to the control mainboard 400 and the battery 500.

Specifically, a buckling groove 240 is formed in the middle shell 200. The buckling groove 240 is located on one side opposite to the notch groove 210. The cover body 300 further includes a buckling piece 320 arranged corresponding to the buckling groove 240.

In the present embodiment, in order to facilitate the use of the intelligent Bluetooth earphone charging box with a built-in rotating shaft of a user, the buckling groove 240 is formed in the middle shell 200. The buckling groove 240 is further used for matching the buckling piece 320, so as to completely close the cover body 300 and the box body. It should be understood that the cover body 300 and the box body are in a closed state when the buckling piece 320 is placed in the buckling groove 240, so as to avoid the situation that the cover body 300 is not tightly closed with the box body, and prevent the Bluetooth earphone from falling out and losing from the Bluetooth earphone charging position.

In one embodiment, the buckling piece 320 is a magnetic suction piece.

From the above, a working principle of the intelligent Bluetooth earphone charging box with a built-in rotating shaft in the embodiments of the present utility model is as follows: the internal space of the intelligent Bluetooth earphone charging box with a built-in rotating shaft in the present utility model is separated into two relatively independent spaces by the bottom shell 100, the middle shell 200, and the cover body 300. One space is a relatively closed mounting space formed by the bottom shell 100 and the middle shell 200. The mounting space is basically kept sealed relative to the external environment except for the time of assembling. Electrical elements, such as the battery 500 and the control mainboard, are accommodated in the mounting space. The other mounting space is a relative open accommodating space formed by the middle shell 200 and the cover body 300. A user takes out the earphone to be charged for use and places the earphone for charging through the accommodating space. The Bluetooth earphone charging position 250 for placing the Bluetooth earphone is arranged on the middle shell 200 of the accommodating space. Electrical communication of the two spaces is realized through the Bluetooth earphone charging position 250. When the Bluetooth earphone is placed at the Bluetooth earphone charging position 250, the control mainboard 400 electrifies a circuit that is communicated with the battery 500, so as to charge the Bluetooth earphone to be charged. When the Bluetooth earphone is taken out from the Bluetooth earphone charging position 250, the control mainboard 400 controls the circuit that is communicated with the battery 500 to disconnect, so as to save electricity, and ensures the electrical safety of the user.

The above description is only preferred embodiments of the present utility model and does not limit the patent scope of the present utility model. Equivalent structural transformations made by using the contents of the specification and the accompanying drawings of the present utility model under the utility model concept of the present utility model, or directly/indirectly applied in other relevant technical fields, are included in the patent protection scope of the present utility model.

What is claimed is:

1. An earphone charging box, comprising:
a box body, comprising a bottom shell and a middle shell, wherein the middle shell is mounted on the bottom shell;
a cover body, wherein the cover body is rotatably mounted on the box body, and the cover body is used for opening or closing the box body; and
a connecting component, comprising a connecting piece and a rotating shaft, wherein the connecting piece is arranged on the cover body in a protruding manner and faces a surface of the middle shell, the rotating shaft is connected to the connecting piece and extends outwards, and the rotating shaft and the cover body are arranged at an interval,
wherein the middle shell is provided with a side surface facing a side wall of the bottom shell and an upper surface facing the cover body; the upper surface is sunken to form a notch groove penetrating to the side surface; the middle shell is provided with an accommodating space formed by an enclosure of the notch groove and the side wall of the bottom shell; the side surface is sunken to form a first groove penetrating to the notch groove; the first groove of the side surface and the side wall of the bottom shell enclose to form a rotating space;
the rotating shaft is rotatably accommodated in the rotating space; and the cover body is rotatably connected to the box body through the rotating shaft, wherein the connecting piece is close to or far away from the accommodating space.

2. The earphone charging box according to claim 1, wherein the first groove penetrates to one groove wall or oppositely arranged two groove walls of the notch groove.

3. The earphone charging box according to claim 1, wherein the cover body is provided with a rotating edge and a covering edge; the connecting component is arranged close to the rotating edge; the rotating shaft is connected to a side, back to the covering edge, of the connecting piece; one end of the rotating shaft is protruded from the connecting piece, or two ends of the rotating shaft are protruded from connecting pieces to be placed in the rotating space.

4. The earphone charging box according to claim 1, wherein the connecting component further comprises a connecting table and a locking piece;
the connecting table is arranged on an inner surface of the cover body in a protruding manner, wherein the connecting table faces the middle shell and corresponds to the notch groove of the middle shell; and
the connecting piece is connected to the connecting table through the locking piece, and the connecting piece is connected to the cover body through the connecting table; the connecting piece is accommodated in the accommodating space when the cover body covers the box body; and the connecting table and the connecting piece are configured to form a tight connection between the cover body and the box body when the cover body and the box body are in a closed state.

5. The earphone charging box according to claim 4, wherein a fixing hole is formed in the connecting table; internal screw threads are formed in an inner wall of the fixing hole; a through hole is formed in the connecting piece; external screw threads are formed in the locking piece; and the locking piece penetrates through the through hole to be in a threaded connection with the fixing hole.

6. The earphone charging box according to claim 4, wherein the connecting component comprises a fixed section and a connecting section connected to the fixed section;
the fixed section is provided with a fitting surface and an exposed surface arranged opposite to the fitting surface; the fitting surface is connected to the connecting table; the exposed surface presses against a bottom of the notch groove when the cover body is closed;
a first end of the connecting section is connected to the fixed section, and a second end of the connecting section is connected to the rotating shaft;
the rotating shaft extends in a direction perpendicular to the fitting surface to the exposed surface and the rotating shaft is protruded from the connecting section; and the connecting section and the fixed section form a second groove together, wherein the second groove takes the connecting section as a bottom.

7. The earphone charging box according to claim 6, wherein the connecting table is provided with a positioning groove; the connecting piece further comprises a positioning piece; and the positioning piece is arranged on the fitting surface.

8. The earphone charging box according to claim 1, wherein the bottom shell is configured to clamp with the middle shell when a boss of the middle shell fits in a third groove of the bottom shell.

9. The earphone charging box according to claim 1, wherein a buckling groove is formed in the middle shell; the buckling groove is formed in an end, far away from the notch groove, of the middle shell; the cover body is provided with a buckling piece arranged opposite to the buckling groove; and the cover body and box body is configured to be in a closed state when the bucking piece fits in the buckling groove.

* * * * *